United States Patent
Wilkins et al.

(10) Patent No.: US 8,325,796 B2
(45) Date of Patent: Dec. 4, 2012

(54) SYSTEM AND METHOD FOR VIDEO CODING USING ADAPTIVE SEGMENTATION

(75) Inventors: Paul Wilkins, Cambridge (GB); James Bankoski, North Greenbush, NY (US); Yaowu Xu, Clifton Park, NY (US)

(73) Assignee: Google Inc., Mountain View, CA (US)

( * ) Notice: Subject to any disclaimer, the term of this patent is extended or adjusted under 35 U.S.C. 154(b) by 1033 days.

(21) Appl. No.: 12/329,177

(22) Filed: Dec. 5, 2008

(65) Prior Publication Data

US 2010/0061444 A1    Mar. 11, 2010

Related U.S. Application Data

(60) Provisional application No. 61/096,242, filed on Sep. 11, 2008.

(51) Int. Cl.
*H04N 11/02* (2006.01)
(52) U.S. Cl. ............... 375/240.02; 375/240; 375/240.01
(58) Field of Classification Search .................. None
See application file for complete search history.

(56) References Cited

U.S. PATENT DOCUMENTS

| | | |
|---|---|---|
| 3,825,832 A | 7/1974 | Frei et al. |
| 4,719,642 A | 1/1988 | Lucas |
| 4,729,127 A | 3/1988 | Chan et al. |
| 4,736,446 A | 4/1988 | Reynolds et al. |
| 4,868,764 A | 9/1989 | Richards |
| 4,891,748 A | 1/1990 | Mann |
| 5,068,724 A | 11/1991 | Krause et al. |
| 5,083,214 A | 1/1992 | Knowles |
| 5,091,782 A | 2/1992 | Krause et al. |
| 5,136,371 A | 8/1992 | Savatier et al. |
| 5,136,376 A | 8/1992 | Yagasaki et al. |
| 5,164,819 A | 11/1992 | Music |
| 5,231,484 A | 7/1993 | Gonzales et al. |

(Continued)

FOREIGN PATENT DOCUMENTS

EP    1351510 A1    10/2003

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Ponnoreay Pich
(74) *Attorney, Agent, or Firm* — Young Basile Hanlon & MacFarlane, P.C.

(57) ABSTRACT

A method for decoding compressed video information is disclosed. The video information can include a plurality of frames each having a plurality of blocks. The method includes reading from the video information a segment map that associates blocks in the frame with four segment identifiers. Each segment identifier is associated with one or more segment parameters, such as quantization parameters, loop filter type, loop filter strength and sub-pixel interpolation filter. The blocks in each segment are then decoded using the associated segment parameters. Segment parameters can persist to following frames unless overwritten by a subsequent frame. A frame can also include a bit suppressing segmentation, in which case default parameters are used for all blocks in the frame.

23 Claims, 6 Drawing Sheets

U.S. PATENT DOCUMENTS

| | | | |
|---|---|---|---|
| 5,270,812 A | 12/1993 | Richards | |
| 5,274,442 A | 12/1993 | Murakami et al. | |
| 5,313,306 A | 5/1994 | Kuban et al. | |
| 5,341,440 A | 8/1994 | Earl et al. | |
| 5,374,958 A | 12/1994 | Yanagihara | |
| 5,432,870 A | 7/1995 | Schwartz | |
| 5,463,701 A * | 10/1995 | Kantner et al. | 382/166 |
| 5,561,477 A | 10/1996 | Polit | |
| 5,576,767 A | 11/1996 | Lee et al. | |
| 5,589,945 A | 12/1996 | Abecassis | |
| 5,659,539 A | 8/1997 | Porter et al. | |
| 5,696,869 A | 12/1997 | Abecassis | |
| 5,734,744 A | 3/1998 | Wittenstein et al. | |
| 5,737,020 A | 4/1998 | Hall et al. | |
| 5,748,247 A | 5/1998 | Hu | |
| 5,774,593 A | 6/1998 | Zick et al. | |
| 5,793,647 A | 8/1998 | Hageniers et al. | |
| 5,818,969 A | 10/1998 | Astle | |
| 5,828,370 A | 10/1998 | Moeller et al. | |
| 5,903,264 A | 5/1999 | Moeller et al. | |
| 5,929,940 A | 7/1999 | Jeannin | |
| 5,930,493 A | 7/1999 | Ottesen et al. | |
| 5,963,203 A | 10/1999 | Goldberg et al. | |
| 5,999,641 A | 12/1999 | Miller et al. | |
| 5,999,655 A | 12/1999 | Kalker et al. | |
| 6,014,706 A | 1/2000 | Cannon et al. | |
| 6,026,183 A | 2/2000 | Talluri et al. | |
| 6,035,060 A | 3/2000 | Chen et al. | |
| 6,041,145 A | 3/2000 | Hayashi et al. | |
| 6,055,330 A | 4/2000 | Eleftheriadis et al. | |
| 6,061,397 A | 5/2000 | Ogura | |
| 6,084,908 A | 7/2000 | Chiang et al. | |
| 6,108,383 A | 8/2000 | Miller et al. | |
| 6,112,234 A | 8/2000 | Leiper | |
| 6,115,501 A | 9/2000 | Chun et al. | |
| 6,119,154 A | 9/2000 | Weaver et al. | |
| 6,125,144 A | 9/2000 | Matsumura et al. | |
| 6,141,381 A | 10/2000 | Sugiyama | |
| 6,167,164 A | 12/2000 | Lee | |
| 6,181,822 B1 | 1/2001 | Miller et al. | |
| 6,185,363 B1 | 2/2001 | Dimitrova et al. | |
| 6,188,799 B1 | 2/2001 | Tan et al. | |
| 6,240,135 B1 | 5/2001 | Kim | |
| 6,249,613 B1 | 6/2001 | Crinon et al. | |
| 6,256,423 B1 | 7/2001 | Krishnamurthy et al. | |
| 6,292,837 B1 | 9/2001 | Miller et al. | |
| 6,327,304 B1 | 12/2001 | Miller et al. | |
| 6,370,267 B1 | 4/2002 | Miller et al. | |
| 6,377,709 B1 | 4/2002 | Guillotel | |
| 6,400,763 B1 | 6/2002 | Wee | |
| 6,414,995 B2 | 7/2002 | Okumura et al. | |
| 6,418,166 B1 | 7/2002 | Wu et al. | |
| 6,522,784 B1 | 2/2003 | Zlotnick | |
| 6,526,097 B1 | 2/2003 | Sethuraman et al. | |
| 6,529,638 B1 | 3/2003 | Westerman | |
| 6,560,366 B1 | 5/2003 | Wilkins | |
| 6,687,303 B1 | 2/2004 | Ishihara | |
| 6,697,061 B1 | 2/2004 | Wee et al. | |
| 6,707,952 B1 | 3/2004 | Tan et al. | |
| 6,754,266 B2 * | 6/2004 | Bahl et al. | 375/240.01 |
| 6,765,964 B1 | 7/2004 | Conklin | |
| 6,826,229 B2 | 11/2004 | Kawashima et al. | |
| 6,934,419 B2 | 8/2005 | Zlotnick | |
| 6,985,526 B2 | 1/2006 | Bottreau et al. | |
| 6,987,866 B2 | 1/2006 | Hu | |
| 7,027,506 B2 | 4/2006 | Lee et al. | |
| 7,027,654 B1 | 4/2006 | Ameres et al. | |
| 7,076,113 B2 | 7/2006 | Le Dinh | |
| 7,116,831 B2 | 10/2006 | Mukerjee et al. | |
| 7,136,534 B2 | 11/2006 | Thyagarajan et al. | |
| 7,143,352 B2 | 11/2006 | Divakaran et al. | |
| 7,170,937 B2 | 1/2007 | Zhou | |
| 7,226,150 B2 | 6/2007 | Yoshimura et al. | |
| 7,236,524 B2 | 6/2007 | Sun et al. | |
| 7,330,509 B2 | 2/2008 | Lu et al. | |
| 7,499,492 B1 | 3/2009 | Ameres et al. | |
| 7,599,435 B2 * | 10/2009 | Marpe et al. | 375/240.16 |
| 2002/0168114 A1 | 11/2002 | Valente | |
| 2003/0095598 A1 | 5/2003 | Lee et al. | |
| 2003/0123545 A1 * | 7/2003 | Prakash et al. | 375/240.08 |
| 2003/0161399 A1 | 8/2003 | Ali | |
| 2003/0202594 A1 | 10/2003 | Lainema | |
| 2004/0120400 A1 | 6/2004 | Linzer | |
| 2004/0208392 A1 | 10/2004 | Raveendran et al. | |
| 2004/0228410 A1 | 11/2004 | Ameres et al. | |
| 2004/0240556 A1 | 12/2004 | Winger et al. | |
| 2005/0013494 A1 | 1/2005 | Srinivasan et al. | |
| 2005/0147165 A1 | 7/2005 | Yoo et al. | |
| 2005/0169374 A1 | 8/2005 | Marpe et al. | |
| 2005/0180506 A1 | 8/2005 | Wittebrood et al. | |
| 2005/0232351 A1 | 10/2005 | Jung | |
| 2005/0265447 A1 | 12/2005 | Park | |
| 2006/0098737 A1 | 5/2006 | Sethuraman et al. | |
| 2006/0114996 A1 | 6/2006 | Thoreau et al. | |
| 2006/0126739 A1 | 6/2006 | Stoner | |
| 2006/0215758 A1 | 9/2006 | Kawashima | |
| 2006/0239345 A1 | 10/2006 | Taubman et al. | |
| 2007/0140342 A1 | 6/2007 | Karczewicz et al. | |
| 2007/0171974 A1 | 7/2007 | Baik | |
| 2008/0056347 A1 | 3/2008 | Chiu et al. | |
| 2008/0151997 A1 | 6/2008 | Oguz | |
| 2008/0212678 A1 | 9/2008 | Booth et al. | |

FOREIGN PATENT DOCUMENTS

| | | |
|---|---|---|
| GB | 2350515 A | 11/2000 |
| GB | 2371434 A | 7/2002 |
| KR | 10-0664929 | 12/2006 |
| WO | 0207164 A2 | 1/2002 |
| WO | 2008002491 A2 | 1/2008 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. Ont Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 2007.

U.S. Appl. No. 12/102,694, Video Compression and Encoding Method, filed Apr. 14, 2008.

U.S. Appl. No. 11/932,870, Video Compression and Encoding Method, filed Oct. 31, 2007.

ON2 Technologies, Inc., White Paper TrueMotion VP7 Video Codec, Jan. 10, 2005, 13 pages, Document Version: 1.0, Clifton Park, New York.

ON2 Technologies, Inc., White Paper On2's TrueMotion VP7 Video Codec, Jul. 11, 2008, 7 pages, Document Version: 1.0, Clifton Park, New York.

Sikora, T. et al., Shape-adaptive DCT for generic coding of video, Circuits and Systems for Video Technology, IEEE Transactions on vol. 5, Issue 1, p. 59-62, Feb. 1, 1995.

Wiegand et al, "Overview of the H 264/AVC Video Coding Standard," IEEE Transactions on Circuits and Systems for Video Technology, vol. 13, No. 7, pp. 568, 569, Jul. 1, 2003.

PCT International Search Report and Written Opinion (Date of Mailing: Mar. 26, 2010); PCT/US2009/056486, filed Sep. 10, 2009.

Sun Y et al, Asynchronous Rate Control for Multi-Object Videos, IEEE Transactions on Circuits and Systems for Video Technology, Aug. 1, 2005, pp. 1007-1018, vol. 15, No. 8 [retrieved from Internet on Jul. 19, 2011] <URL: http://ieeexplore.ieee.org/stamp/stamp.jsp?tp=&arnumber=1490554>.

Lee et al, Bit Allocation for MPEG-4 Video Coding with Spatio-Temporal Tradeoffs, Jun. 2003, pp. 488-502, [retrieved from Internet on Jul. 19, 2011] <URL:http://ieeexplore.ieee.org/stamp/stamp.jsp?tp=&arnumber=1207406>.

Moschetti et al, Automatic Object Extraction and Dynamic Bitrate Allocation for Second Generation Video Coding, Multimedia and Expo, 2002. ICME '02 Proceedings. 2002 IEEE International Conference on Lausanne, Switzerland, Aug. 26, 2002, pp. 493-496, vol. 1,Piscataway, New Jersey, USA.

Nunes P et al, Rate Control for Scenes with Multiple Arbitrarily Shaped Video Objects, ITG Fachberichte, Jan. 1, 1997, pp. 303-308, Berlin, Germany.

Flexible Macroblock Ordering; Wikipedia; Jul. 15, 2008.

Marcos Nieto, Luis Salgado, Narciso Garcia; Fast Mode Decision Based on Activity Segmentation in H.264/AVC Encoding; Grupo de Tratamiento de Imagenes—E.T.S. Ingenieros de Telecomunicacion, Universidad Politecnica de Madrid, Spain; Springer-Verlag Berlin Heidelberg 2006.

* cited by examiner

SYSTEM AND METHOD FOR VIDEO CODING USING ADAPTIVE SEGMENTATION

CROSS-REFERENCE TO RELATED APPLICATIONS

This application claims priority to U.S. provisional patent application No. 61/096,242, filed Sep. 11, 2008, which is incorporated herein in its entirety by reference.

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, people have higher expectations for video quality and expect high resolution video with smooth playback at a high frame rate.

There can be many factors to consider when selecting a video coder for viewing digital video. Some applications may require excellent video quality where others may need to comply with various constraints including, for example, bandwidth or storage requirements. To permit higher quality transmission of video while limiting bandwidth consumption, a number of video compression schemes are noted including proprietary formats such as VPx (promulgated by On2 Technologies, Inc. of Clifton Park, N.Y.), H.264 standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

Modern video coding methods adjust certain compression parameters at a level of granularity that is smaller than a whole frame. For example, some compression schemes adjust the type or strength of the loop filter applied to macroblock or block boundaries to improve video quality shown to the viewer. Further, for example, a different quantization level can be applied to each macroblock in a frame. In this manner, macroblocks with important information can be transmitted at a high bit rate whereas macroblocks with less important information can be transmitted at a low bit rate.

SUMMARY

Embodiments of a method for encoding and decoding video information are taught herein. In one embodiment, a method decodes compressed video information that includes a plurality of frames, each having a plurality of blocks. The method includes reading from the video information a segment map associating at least one block in at least one frame with at least one segment identifier. The segment identifier is decoded using a binary arithmetic decoder in some embodiments. The method also includes reading from the information at least one segment parameter associated with the at least one segment; and decoding the at least one block using the set of segment parameters. In some embodiments, the segment parameters include at least one of the following: quantization parameters, loop filter type, loop filter strength and sub-pixel interpolation filter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
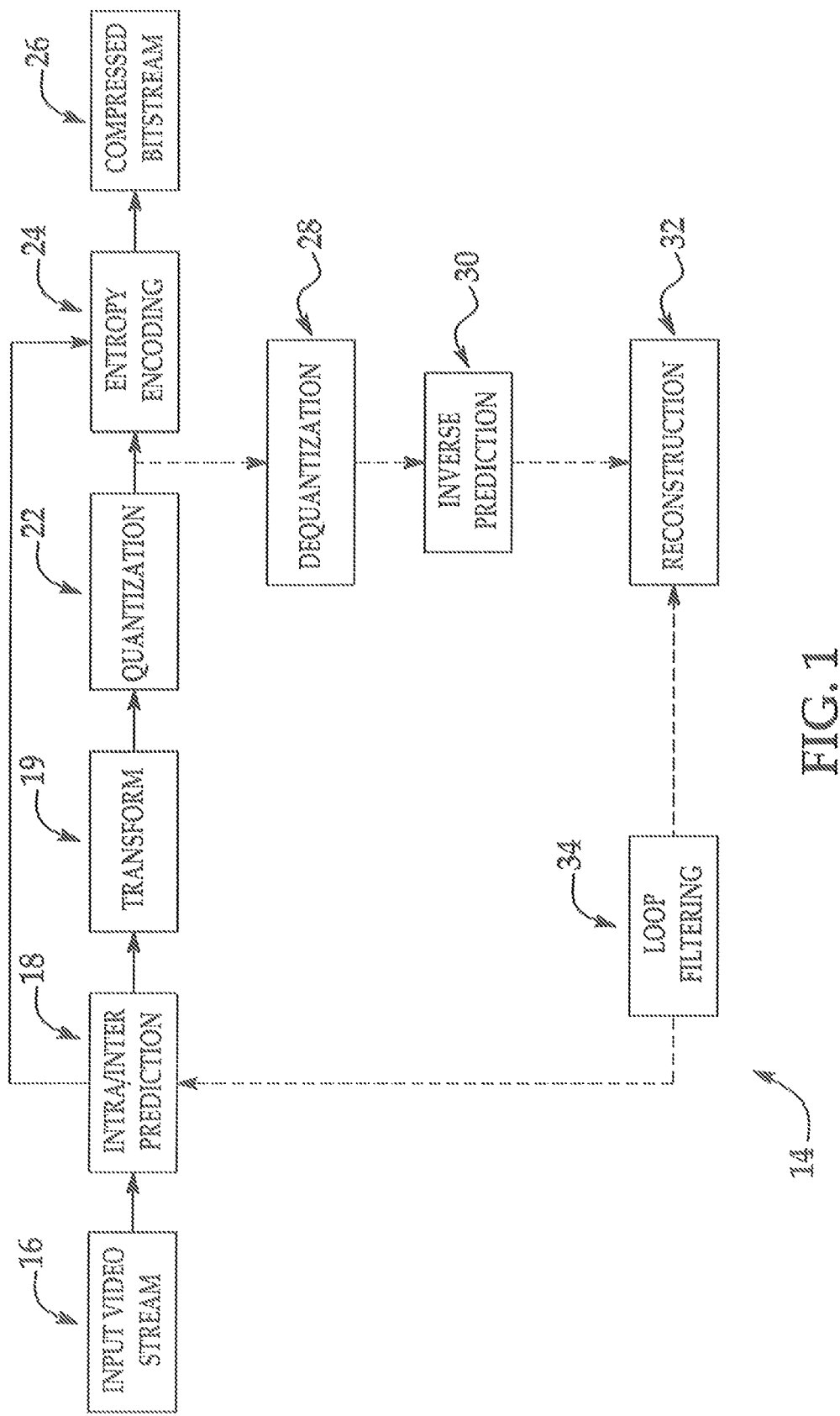
FIG. 1 is a block diagram of a video compression system in accordance with one embodiment of the present invention.

Video compression usually refers to reducing the quantity of data that represents a video signal by permanently eliminating certain redundant information in the video signal. The compression may be needed to comply with various constraints including, for example, bandwidth or storage requirements. Examples of such compression standards include MPEG and H.264.

Block-based video compression operates on, for example, fixed-shaped groups of neighboring pixels, often called a macroblock. For example, the H.264 standard specifies macroblocks of 16×16 pixels. In general, each frame of video can be divided into macroblocks, where each macroblock consists of a plurality of smaller-sized blocks. These pixel groups within the macroblocks and blocks are compared with either data found in the current frame or in other frames in order to formulate prediction data and error signals.

The error signals for each block are then transformed using, for example, a discrete cosine transform (DCT). The resulting transform coefficients for each block are then quantized, and the quantized coefficients are then encoded according to an encoding scheme such as context-adaptive binary arithmetic coding (CABAC).

The degree to which the transform coefficients are quantized, referred to as the quantization level, affects the number of bits used to represent the image data as well as the quality of the resulting decoded image. Generally, when the quantization level is set to a high value, more coefficients are set to 0. This results in higher compression but also deteriorates the quality of the image. Conversely, when the quantization level is set to a low value, fewer coefficients are set to 0. This results in improved image quality but less compression.

Since visual quality of the video can depend on how the quantization level is distributed across frames in a video sequence, it is useful to control the quantization level across each frame. Some current techniques apply a uniform quantization level across each frame. However, these techniques do not allow for applying a lower quantization level to parts of a frame that are of more visual importance, such as a human face. Similarly, these uniform quantization level techniques also do not allow for applying a higher quantization level to parts of a frame that are of less visual importance, such as a background region.

To overcome these difficulties, it would be desirable to efficiently select the quantization level for each macroblock without increases in overhead and computational complexity of the encoder/decoder.

Block artifacts manifest as discontinuities between adjacent blocks. Such discontinuities are visually disturbing and also reduce the effectiveness of a reconstructed frame as a predictor for subsequent frames.

To remove these discontinuities, loop filtering can be applied to reconstructed frames during a reconstruction path, which is discussed in more detail below. The choice of loop filter and the strength of the loop filter can have a significant effect oh image quality. A filter that is too strong may cause blurring and loss of detail. A filter that is too weak may not adequately suppress discontinuities between adjacent blocks.

As such, described herein are embodiments of an efficient adaptive segmentation scheme for efficiently transmitting a segmentation map and a set of parameters, such as a quantization level and loop filter type and/or strength, to be applied to each segment in the segmentation map.

Although the description of embodiments of the adaptive segmentation innovations are described in the context of the VP8 video coding format, alternative embodiments of the present invention can be implemented in the context of other video coding algorithms.

FIG. 1 is a block diagram of a generalized video encoder 14 using a loop filter 34 according to one embodiment of the present invention. Referring to FIG. 1, to encode an input video stream 16, encoder 14 performs functions in a forward path (shown by the solid connection lines) to produce an encoded or compressed bitstream 26, where the forward path includes intra/inter prediction stage 18, transform stage 19, quantization stage 22 and entropy encoding stage 24. Encoder 14 also includes a reconstruction path (shown by the dotted connection lines) to reconstruct a frame for encoding of further macroblocks. Encoder 14 includes the following stages in the reconstruction path: dequantization stage 28, inverse transform (or prediction) stage 30, reconstruction stage 32 and loop filtering stage (also called loop filter) 34. Other structural variations of encoder 14 can be used to encode bitstream 26.

Referring to FIG. 1, when input video stream 16 is presented for encoding, each frame within input video stream 16 can be processed in units of macroblocks. At intra/inter prediction stage 18, each macroblock can be encoded using either intra prediction or inter prediction mode. In either case, a prediction macroblock can be formed based on a reconstructed frame. In the case of intra-prediction, a prediction macroblock can be formed from samples in the current frame that have been previously encoded and reconstructed. In the case of inter-prediction, a prediction macroblock can be formed from one or more reference frames such as previous or future frames that have already been encoded and reconstructed.

Next, still referring to FIG. 1, the prediction macroblock can be subtracted from the current macroblock to produce a residual macroblock (residual). Transform stage 19 transform codes the residual and quantization stage 22 quantizes the residual to provide a set of quantized transformed coefficients. The quantized transformed coefficients are then entropy coded by entropy encoding stage 24. The entropy-coded coefficients, together with the information required to decode the macroblock, such as the type of prediction mode used, motion vectors and quantizer value, are output to compressed bitstream 26.

The reconstruction path in FIG. 1 is present to permit both the encoder and the decoder to use the same reference frames required to decode the macroblocks. The reconstruction path, similar to functions that take place during the decoding process, which are discussed in more detail below, includes dequantizing the transformed coefficients by dequantization stage 28 and inverse transforming the coefficients by inverse transform stage 30 to produce a derivative residual macroblock (derivative residual). At the reconstruction stage 32, the prediction macroblock can be added to the derivative residual to create a reconstructed macroblock. The loop filter 34 can be applied to the reconstructed macroblock to reduce blocking artifacts.

Figure 2:
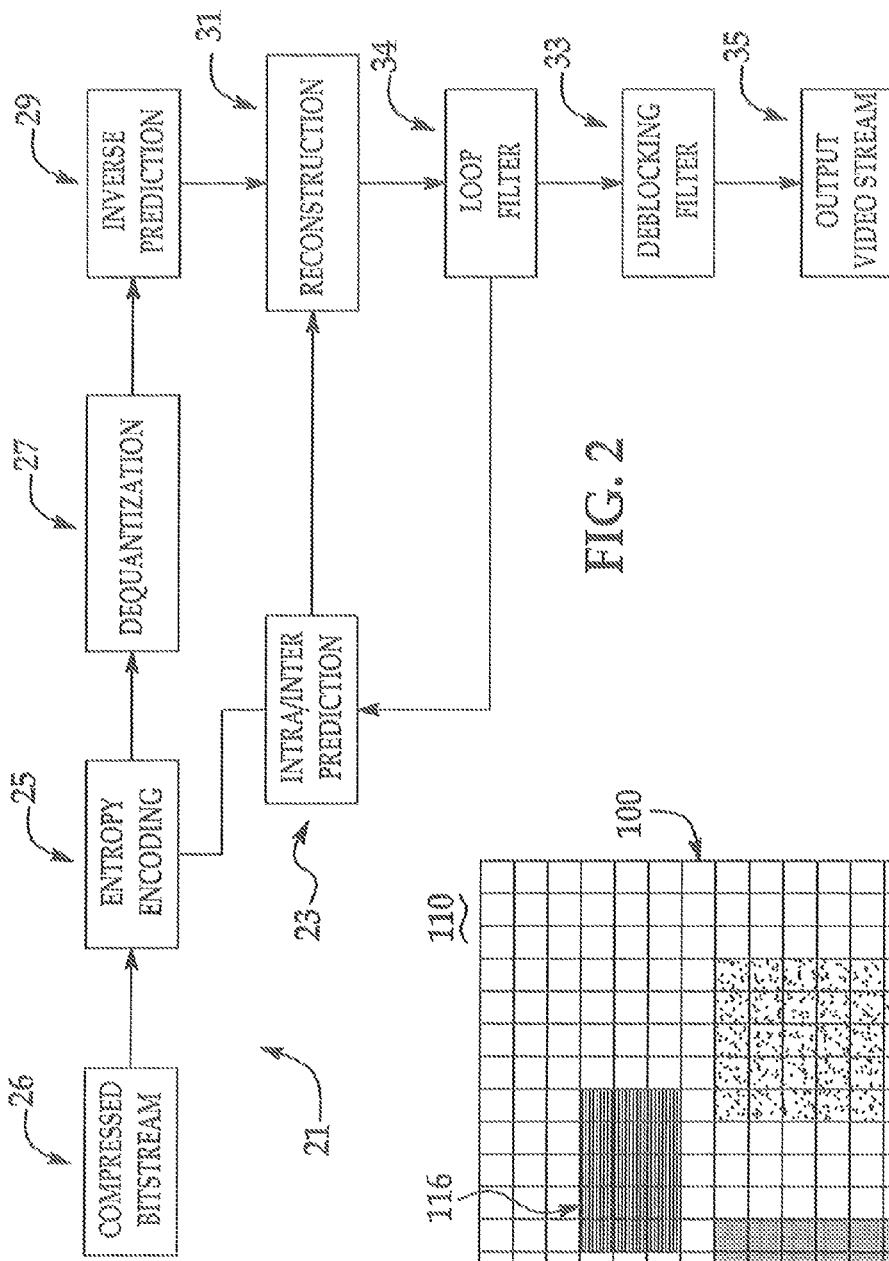
FIG. 2 is a block diagram of a video decompression system in accordance with one embodiment of the present invention.

Referring to FIG. 2, in accordance with one embodiment, to decode compressed bitstream 26, a decoder 21, similar to the reconstruction path of the encoder 14 discussed previously, performs functions to produce an output video stream 35 using entropy decoding stage 25, dequantization stage 27, inverse transform (or prediction) stage 29, intra/inter prediction stage 23, reconstruction stage 31, loop filter 34 and deblocking filtering stage (also called deblocking filter) 33. Other structural variations of decoder 21 can be used to decode compressed bitstream 26.

When compressed bitstream 26 is presented for decoding, the data elements can be entropy decoded by entropy decoding stage 25 to produce a set of quantized coefficients. Dequantization stage 27 dequantizes and inverse transform stage 29 inverse transforms the coefficients to produce a derivative residual that is identical to that created by the reconstruction stage in encoder 14. Using header information decoded from the compressed bitstream 26, at intra/inter prediction stage 23, decoder 21 creates the same prediction macroblock as was created in encoder 14. At the reconstruction stage 33, the prediction macroblock can be added to the derivative residual to create a reconstructed macroblock. The loop filter 34 can be applied to the reconstructed macroblock to reduce blocking artifacts. A deblocking filter 33 can be applied to the reconstructed macroblock to further reduce blocking distortion and the result can be outputted to output video stream 35.

Figure 3:
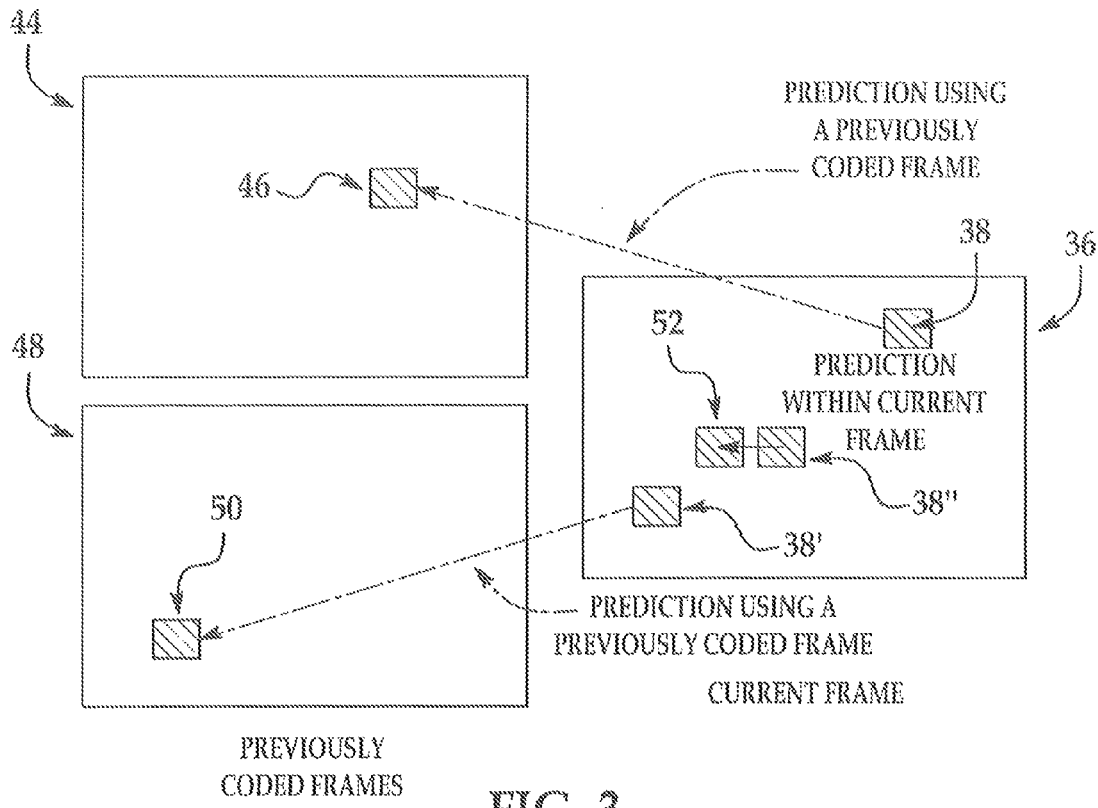
FIG. 3 is a schematic diagram of intra-prediction and inter-prediction modes used in the video compression and decompression systems of FIGS. 1 and 2.

FIG. 3 shows reference frames 44, 48 and a current frame 36 that is currently being encoded or decoded. As discussed previously, each frame can be processed in units of macroblocks, and at intra/inter prediction stage 18, each macroblock can be encoded using either intra prediction or inter prediction mode. For example, a current macroblock 38 can be encoded or decoded using inter prediction from a macroblock 46 from previously coded reference frame 44. Similarly, a current macroblock 38' can be encoded or decoded using inter prediction from a macroblock 50 from previously encoded reference frame 48. Also, for example, a current macroblock 38" can be encoded or decoded using intra prediction from a macroblock 52 within current frame 36.

Figure 4A:
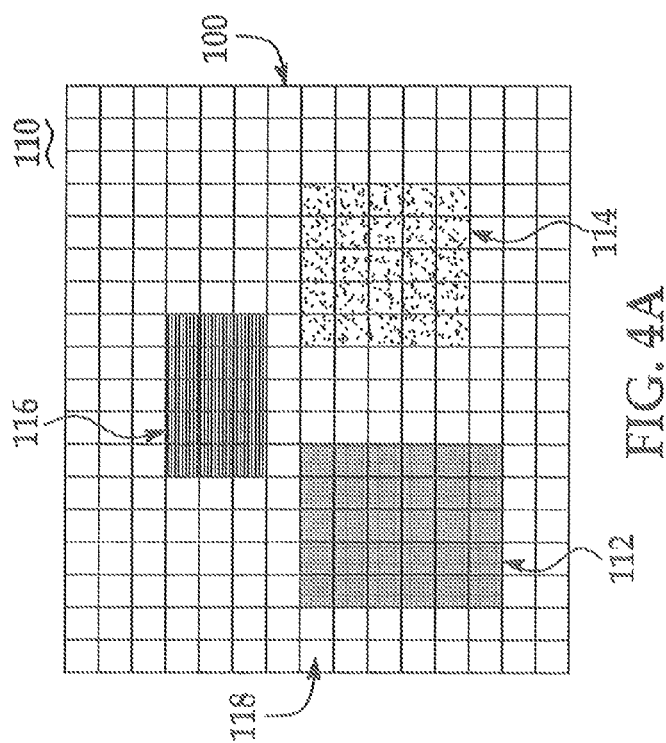
FIG. 4A is an exemplary segmentation map used in the video compression and decompression systems of FIGS. 1 and 2.
Figure 4B:
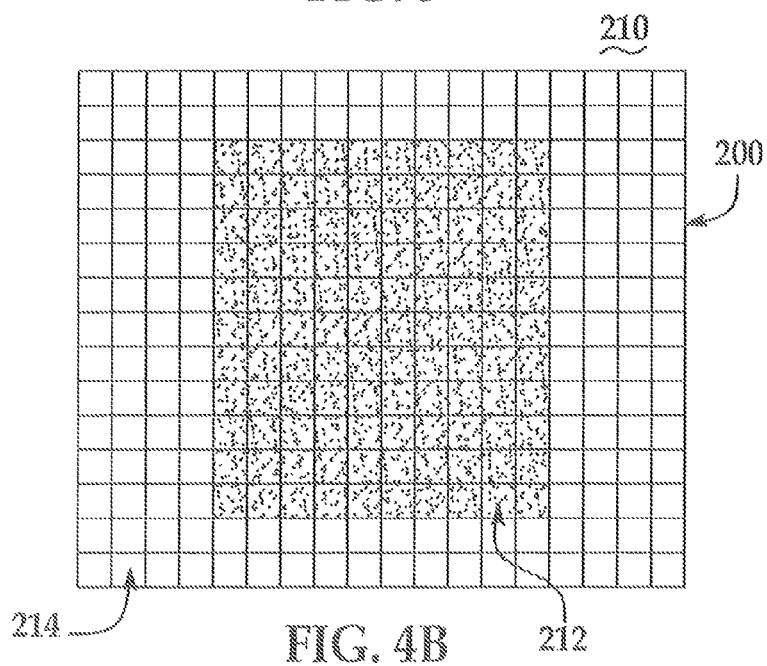
FIG. 4B is an alternative exemplary segmentation map used in the video compression and decompression systems of FIGS. 1 and 2.

FIGS. 4A-4B illustrate exemplary segmentation maps for sample frames according to embodiments of the present invention.

Referring to FIG. 4A, an exemplary segmentation map 100 segments a frame 110 into four segments: three foreground segments 112, 114, and 116 and one background segment 118. According to one embodiment of the present invention, all of the macroblocks corresponding to foreground segment 112 (as shown by the white macroblocks) are encoded using the same quantization level and loop filter type and/or strength, all of the macroblocks corresponding to foreground segment 114 (as shown by the black macroblocks) are encoded using the same quantization level and loop filter type and/or strength, all of the macroblocks corresponding to foreground segment 116 (as shown by the dotted macroblocks) are encoded using the same quantization level and loop filter type and/or strength, and all of the macroblocks corresponding to background segment 118 (as shown by the lined macroblocks) are encoded using the same quantization level and loop filter type and/or strength. Accordingly, each segment may have a different quantization level and loop filter type and/or strength.

Segmentation map 100 can be useful when encoder 14 is coding frames that include image data having foreground and background imagery where the image data in the foreground varies more from frame to frame than the background imagery. A sequence of frames could include the faces of three people having a conversation in front of a house. The three faces would be an example of foreground imagery and the house would be an example of background imagery. Since video quality can be more important at foreground segments 112, 114 and 116 rather than at background segment 118, a lower quantization level and a better loop filter type and/or strength can be applied to foreground segments 112, 114 and 116.

Referring to FIG. 4B, an exemplary segmentation map 200 segments a frame 210 into two segments: one body segment 212 and one border segment 214. According to one embodiment of the present invention, all of the macroblocks corresponding to body segment 212 (as shown by the dotted macroblocks) are encoded using the same quantization level and loop filter type and/or strength and all of the macroblocks corresponding to border segment 214 are encoded using the same quantization level and loop filter type and/or strength (as shown by the white macroblocks).

Segmentation map 200 can be useful when encoder 14 is coding a sequence of images where there is a zoom-in. Since video quality can be more important at body segment 212, rather than at border segment 214, lower quantization level and a better loop filter type and/or strength can be applied to body segment 212.

FIGS. 4A and 4B only provide examples of segmentation maps. Other suitable segmentation maps are also available that, for example, contain any number of segments, contain equally-sized or unequally-sized segments, contain contiguous or non-contiguous macroblocks, or are either user-defined or pre-set within the encoder.

The choice to enable/disable segmentation (i.e. segmentation condition) and the definition of the segmentation map may be decided by the encoder, passed in by an external application or specified by a user. As one example, a video conferencing application may pass in a map to define a segment of where a person's head is located.

Figure 5:
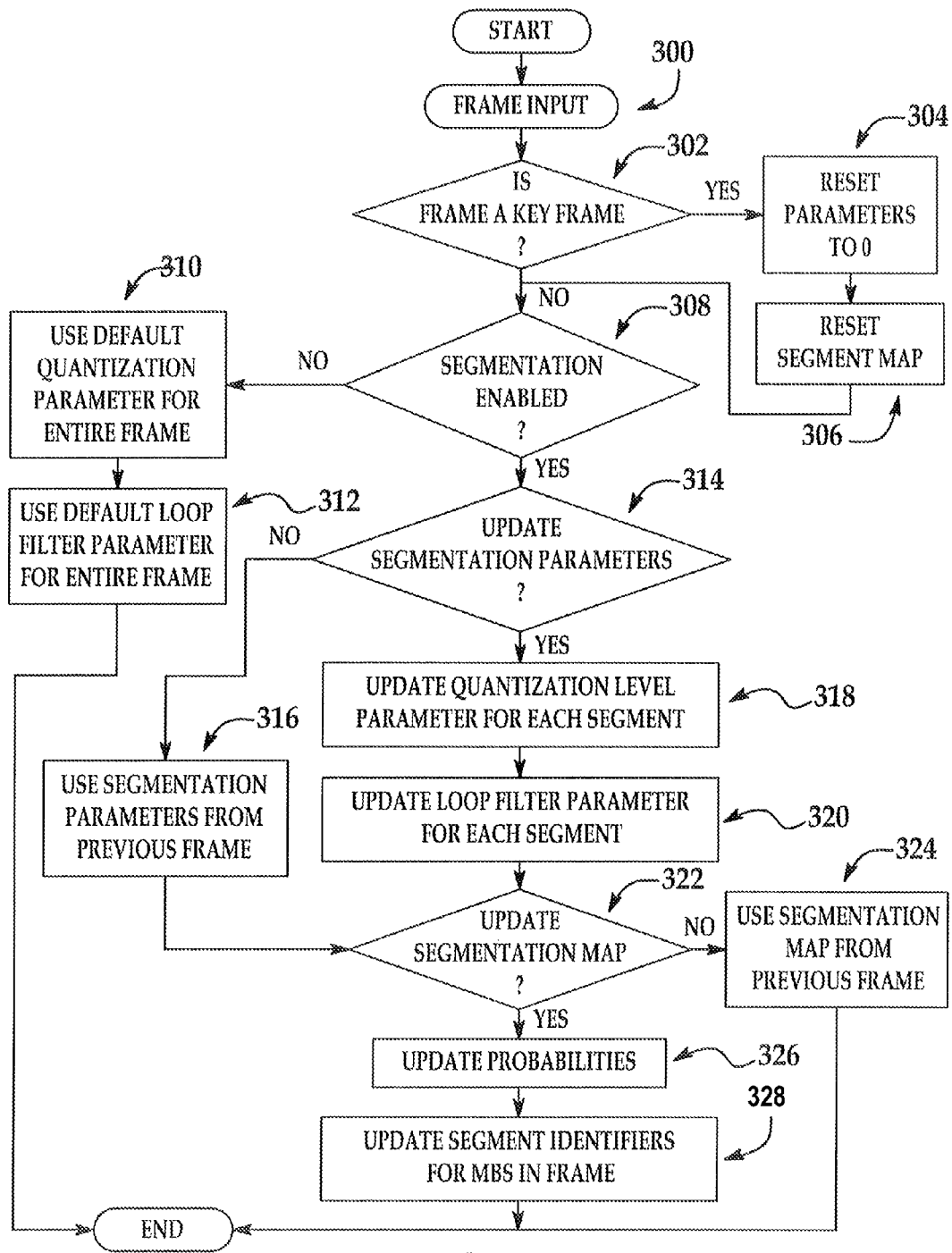
FIG. 5 is a flowchart diagram of a method of controlling segmentation of video used in the video compression system of FIG. 1.

FIG. 5 is a flowchart of a method of controlling segmentation of video data according to one embodiment of the present invention. Referring to FIG. 5, encoder 14 receives frame input at step 300. Encoder 14 then determines whether the current frame is a frame coded without reference to any other frame except itself, which is commonly referred to as a key frame at step 302. If the current frame is a key frame, encoder 14 resets the parameters to zero at step 304 and resets the segment map at step 306 in order to map all macroblocks to the same segment. The parameters are, for example, the quantization level and loop filter strength. Encoder 14 then proceeds to step 308.

If the current frame is not a key frame or if the current frame is a key frame and encoder 14 has reset the parameters and segment map, encoder 14 then determines if segmentation is enabled at step 308. The bitstream header for each frame includes a single bit that enables or disables segmentation. However any suitable flag, data structure or other data record can be used in lieu of a bit. If segmentation is disabled, encoder 14 can apply a default quantization parameter at step 310 and a default loop filter strength parameter at step 312 to the whole frame.

Segmentation parameters may be, for example, a quantization level, a loop filter type, a loop filter strength, a reference frame type or a selection of a sub-pixel interpolation filter. Other segmentation parameters are also available.

As one example, one of the segment parameters may be a reference frame type. The reference frame type may have values indicative one or more previous frames, future frames or some combination thereof that have already been encoded and reconstructed. Accordingly, reference frame type may include, for example, a last frame, a golden frame or an alternate reference frame. The last frame can be the previously encoded frame before the current frame. The golden frame can be a past frame chosen arbitrarily from the distant past to use as a predictor for subsequent frames. The alternate reference frame may include any frame that is not the last frame or the golden frame. For example, the alternate reference can be a past frame, a future frame, or a constructed reference frame. Further, for example, the constructed reference frame may be the reference frame as disclosed in patent application titled "System and Method for Video Encoding Using Constructed Reference Frame" that is assigned to the assignee of the present invention, is filed concurrently herewith and which is hereby incorporated by reference in its entirety.

Encoder 14 and decoder 21 can then apply selective updates to those macroblocks that correspond to a given segment id in one or more reference frames as indicated by the segment parameter. In this way segmentation can be used as a method for updating a part of one or more of the reference frames, for example the background, using information from the current frame, without having to resort to a full update of the whole reference frame.

Although the embodiments of the adaptive segmentation innovations describe only two segmentation parameters (namely quantization level and loop filter strength), alternative embodiments of the present invention can be implemented using different segmentation parameters or any number of segmentation parameters.

If segmentation is disabled, encoder 14 can ignore any previously transmitted segmentation map as well as any previously transmitted segmentation parameters. This segmentation enable/disable binary switch or segmentation condition minimizes overhead and produces no more than one bit per frame for frames where segmentation provides little or no benefit.

Still referring to FIG. 5, if however segmentation is enabled, encoder 14 can determine if segmentation parameters are to be updated at step 314. If no updates to the segmentation parameters have been indicated, encoder 14 can use previously transmitted segmentation parameter values at step 316. In other words, the segmentation parameters can not be updated for the current video frame. This update segmentation parameters binary switch minimizes overhead by not retransmitting segmentation parameters where the segmentation parameters from the previous frame can be used for the current frame.

If updates to the segmentation parameters have been indicated, encoder 14 can update the segmentation parameters. Specifically, in our exemplary embodiment, the quantization level parameter can be updated at step 318 and the loop filter strength parameter can be updated at step 320. The updated segmentation parameter values may either be absolute values or alternatively, delta (i.e. incremental or decremental) values that are added to baseline values. If the parameter values are delta, a clamping mechanism may be implemented to prevent the segmentation parameter values from exceeding an allowable range.

Still referring to FIG. 5, whether or not segmentation parameters are updated at step 314, encoder 14 can determine if segmentation map 100, 200 is to be updated at step 322. If no updates to segmentation map 100, 200 have been indicated, encoder 14 can use the previously transmitted segmentation map at step 324. This update segmentation map binary switch minimizes overhead by hot retransmitting segmentation map 100, 200 where the segmentation map from the previous frame can be used for the current frame.

If updates to segmentation map 100, 200 have been indicated, encoder 14 can update probabilities of occurrence of each of the segment identifier bits at step 326. After probabilities of occurrence have been updated, encoder 14 can update segment identifiers for macroblocks in the current frame at step 328. Referring back to FIG. 4A, for example, segment identifiers associate each macroblock with a particular segment 112, 114, 116, 118 in segmentation map 100. Accordingly, if there are four segments 112, 114, 116, 118, there can be four segment identifiers that can be identified as, for example as 00, 01, 10 and 11. The process of FIG. 5 can be repeated for each frame that is received by encoder 14.

Exemplary pseudo code for implementing frame level header information to control the update of segmentation parameters and the segment map in adaptive segmentation is illustrated as follows:

```
// Is Segmentation Enabled
WriteBit( SegmentationEnabled );
if ( SegmentationEnabled )
{
  // Signal whether or not the segmentation map and parameters are to
    be updated in this frame
  WriteBit( UpdateMbSegmentationMap );
  WriteBit( UpdateMbSegmentationParams );
  if (UpdateMbSegmentationParams)
  {
    WriteBit( MbSegmentAbsOrDelta );   // 0 indicates parameters
are delta values, 1 absolute values
    // For each segment parameter (quantizer and loop filter strength)
    for ( i = 0; i < 2; i++ )
    {
      for ( j = 0; j < 4; j++ )   // For each of the segments
      {
        Data = SegmentFeatureData[i][j];
        // Frame level data
        if ( Data )           // parameter is non zero
        {
          WriteBit (1);
          if (Data < 0)
          {
          WriteBit (1);       // – value (sign bit)
          Data = –Data
          }
          else
          WriteBit (0);       // + value (sign bit)
                // In VP8 7 bits for quantizer parameter and
                  6 for loop filter
```

```
          WriteLiteral( Data, MbFeatureDataBits[i]);
        }
        else
          WriteBit(0);        // Parameter was set to 0.
      }
    }
  }
  if ( UpdateMbSegmentationMap )
  {
    // Write out the tree node probabilities used to decode the segment
      id for each macro block.
    for ( i = 0; i < 3; i++ )
    {
      Data = MbSegmentTreeProbs[i];
      if ( Data != 255)
      {
        WriteBit(1);
        WriteLiteral(Data, 8);
      }
      else
        WriteBit(0);
    }
  }
}
```

Referring to the pseudo code above, the following is the list of variables and arrays and their significance to embodiments of the present invention:

SegmentationEnabled: segmentation enable/disable binary switch.

UpdateMbSegmentationMap: segmentation map update/no update binary switch.

UpdateMbSegmentationParams: segmentation parameters update/no update binary switch.

MbSegmentAbsOrDelta: binary switch to indicate whether values of the segmentation parameters in SegmentFeatureData array are delta values or absolute values.

SegmentFeatureData[i][j]: values of the segmentation parameters (e.g. quantizer or loop Filter strength)

MbSegmentTreeProbs[i]: Tree node probabilities (see FIG. 6 below).

Referring to the pseudo code, the SegmentationEnabled variable can be written to the bitstream to indicate whether segmentation is enabled. If segmentation is not enabled, neither the segmentation parameters nor the segmentation map are updated and, as discussed previously, any previously transmitted segmentation parameters or segmentation map are ignored by encoder 14 and decoder 21. If however, segmentation is enabled, the UpdateMbSegmentationParams bit can be written to indicate whether the segmentation parameters should be updated and UpdateMbSegmentationMap can be written to indicate whether the segment map should be updated. Any suitable flag, data structure or other data record can also be used in lieu of a bit.

If UpdateMbSegmentationParams is true, the MbSegmentAbsOrDelta bit can be written to the bitstream to indicate whether the segmentation parameters are delta values or absolute values. Then, for each of the two segment parameters (i.e., quantizer value and loop filter strength) for each of the four segments, the data in SegmentFeatureData[i][j] can be written to the bitstream with its corresponding sign bit (if any). Any suitable flag, data structure or other data record can also be used in lieu of a bit.

If UpdateMbSegmentationMap is true, encoder 14 determines whether the data in MbSegmentTreeProbs[i] can be updated by testing whether any of the values in MbSegmentTreeProbs[i] array is 255. If one of the values in the array is 255, the particular node probability should not be updated.

Otherwise, each node probability in MbSegmentTreeProbs[i] can be written to the bitstream.

The cost of updating the node probabilities can be incurred at the frame level and can be minimal. Following the pseudo code above, the cost can be anywhere from 3-27 bits per frame depending on how many probabilities are being updated. At the low-cost end, 3 bits result when the conditions indicate that none of the node probabilities should be updated. Accordingly, encoder 14 can perform a Writebit(0) operation three times. At the high-cost end, 27 bits result when the conditions indicate that all three of the node probabilities should be updated. Accordingly, encoder 14 can perform a Writebit(1) operation three times and write the three probability values from MbSegmentTreeProbs[i] at a cost of 8 bits each.

Alternatively, in one embodiment if UpdateMbSegmentationMap is true, all three probabilities from MbSegmentTreeProbs[i] at a cost of 8 bits each are always written to the bitstream at a cost of 24 bits. Exemplary pseudo code illustrating this embodiment is illustrated as follows:

```
if ( UpdateMbSegmentationMap )
{
    // Write out the tree node probabilities used to decode the segment
      id for each macro block.
    for ( i = 0; i < 3; i++ )
    {
        Data = MbSegmentTreeProbs[i];
        WriteLiteral(Data, 8);
    }
}
```

Figure 6:
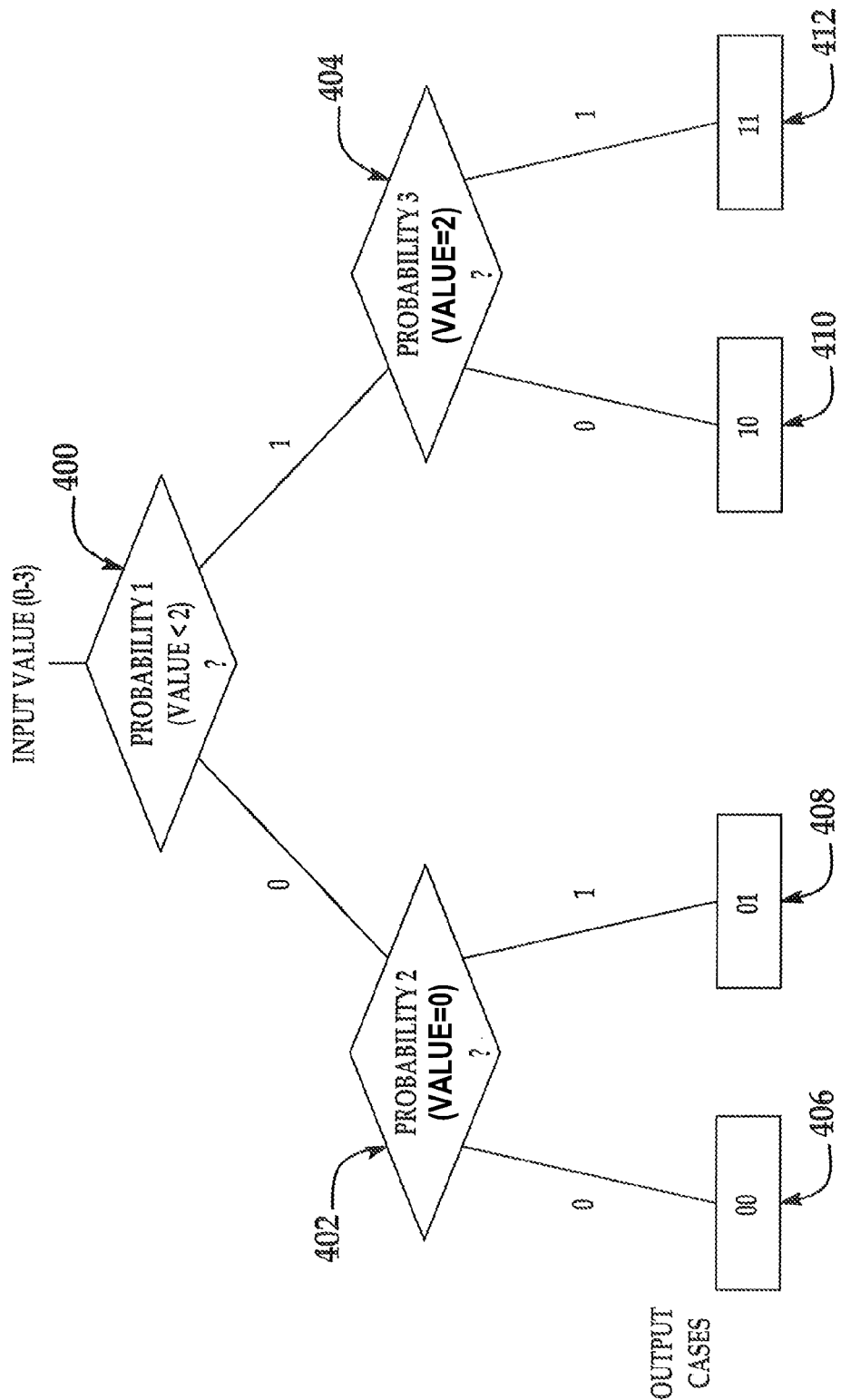
FIG. 6 is a schematic diagram of a binary tree used to code segment identifiers used in the video compression and decompression systems of FIGS. 1 and 2.

FIG. 6 illustrates the binary tree used to code the segment identifiers using the probabilities that a particular outcome 406, 408, 410 and 412 can occur. Each outcome 406, 408, 410 and 412 represents one of four segment identifiers: 00, 01, 10 and 11. As stated previously, embodiments of the invention may have different numbers of segment identifiers. Depending on the number of segments in various embodiments, the binary tree in FIG. 6 would be modified accordingly to represent the number of probabilities needed to code the particular number of segments. So, for example, if one embodiment contained 8 segments, the binary tree would include 7 probabilities at 7 different nodes in order to code 8 particular outcomes.

Each node 400, 402 and 404 has an associated probability that defines, for example, the likelihood that the left branch can be taken. The left branch, as illustrated in FIG. 6, corresponds to bits representing 0 whereas the right branch corresponds to bits representing 1. The likelihood that the left branch can be taken is the probability that value can correspond to what is represented at each node 400, 402 and 404. Accordingly, probability 1 at node 400 represents the likelihood that value can be less than 2. In other words, probability 1 represents the likelihood that outcomes 406, 408 can occur because they have a value of binary 00 and binary 01, respectively, which are less than 2. The formula 1—probability 1 can be used to calculate the likelihood that the right branch of node 400 can occur. In other words, 1—probability 1 represents the likelihood that outcomes 410, 412 can occur because they have a value of binary 10 and binary 11, respectively, which are greater than 2.

Probability 2 at node 402 represents the likelihood that value can be equal to 0. In other words, probability 2 represents the likelihood that outcome 406 can occur because it has a value of binary 00, which is equal to 0. The formula 1—probability 2 can be used to calculate the likelihood that the right branch of node 402 can occur. In other words, 1—probability 2 represents the likelihood that outcome 408 can occur because it has a value of binary 01, which is not equal to 0.

Probability 3 at node 404 represents the likelihood that value can be equal to 2. In other words, probability 3 represents the likelihood that outcome 410 can occur because it has a value of binary 10, which is equal to 2. The formula 1—probability 3 can be used to calculate the likelihood that the right branch of node 404 can occur. In other words, 1—probability 3 represents the likelihood that outcome 412 can occur because it has a value of binary 11, which is not equal to 2.

Probability can be expressed, for example, as an integer in the range of 1-254 where 1 represents that it is least likely that the left branch of each node 400, 402 and 404 can occur and 254 represents that it is most likely that the left branch of each node 400, 402 and 404 can occur. Each probability reflects the number of macroblocks that have been assigned to each segment. Accordingly, if most macroblocks are assigned to segment 00, probability 1 and probability 2 can be high. The probability can also be expressed using different ranges or values and signify other meaning such as the likelihood that the right branch can be taken.

There are various types of coding schemes, such as arithmetic coding or Huffman coding. Since arithmetic coding translates the entire message sequence into one number whereas Huffman coding than translates each symbol of the message into a series of digits, arithmetic coding can be more efficient than Huffman coding. Accordingly, arithmetic coding can be used in the preferred embodiment of the invention. Other coding schemes, like Huffman coding, or combinations of coding schemes are used in alternative embodiments of the invention.

An arithmetic encoder can be used to encode at entropy encoding stage 24 (see FIG. 1) or decode at entropy decoding stage 25 (see FIG. 2) a zero or one using each of the three probabilities in order to represent one of the four segment identifiers. Arithmetic coding generally involves representing a message sequence as a single floating point output number within a given range. Typically, this range can be a probability line from 0 to 1. Each symbol (i.e., segment identifier) in the message sequence can be represented by ranges occupying a part of the probability line. If a symbol has a high probability, it can receive a larger range on the probability line, and if a symbol has a low probability, it can receive a smaller range on the probability line.

During coding, the real number used to represent the message sequence can be formulated based on what range each symbol falls in. As each symbol in the message is processed, the range can be narrowed to that portion allocated to the symbol. As the message becomes longer, the range needed to represent it becomes smaller, and the number of bits needed to specify that range grows. The more likely symbols (i.e. symbols that have a higher probability) reduce the range by less than the unlikely symbols (i.e. symbols that have a lower probability) and thus, add fewer bits to the message.

Referring back to FIG. 6, if each segment identifier would be coded separately, it would be at a cost of 2 bits per segment identifier. However, using the arithmetic coding scheme above, if all four segment identifiers are being used but some have higher probabilities than others, the average cost of coding the segment identifiers can be much less than 2 bits. If less than four segment identifiers are being used, the cost of coding each of the segment identifiers can be even less.

Figure 7:
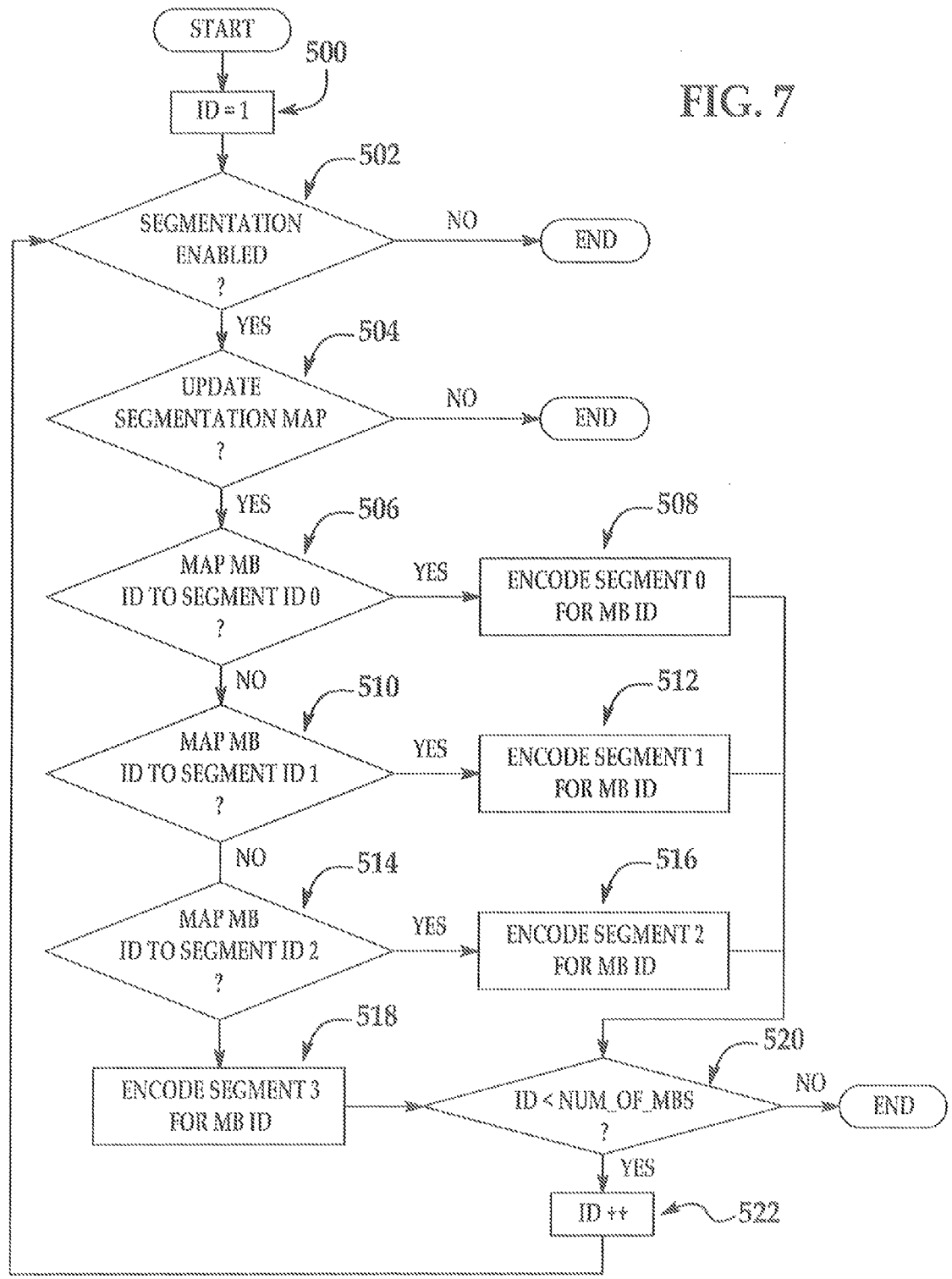
FIG. 7 is a flowchart diagram of a method of encoding a segment identifier used in the video compression system of FIG. 1.

FIG. 7 is a flowchart of a method of encoding a segment identifier for each macroblock according to one embodiment of the present invention. At step 500, encoder 14 sets the first macroblock to ID equals 1. ID represents the macroblock identification number that is currently being encoded in the frame.

Then, encoder 14 determines whether segmentation is enabled at step 502. If segmentation is not enabled, a segment identifier is not encoded for the macroblock. If segmentation is enabled, encoder 14 determines whether the segmentation map is to be updated at step 504. If an update to the segmentation map has not been indicated, a new segment identifier is hot encoded for the macroblock and the previous segment map can be used in coding.

If however, an update to the segmentation map has been indicated, a macroblock can be assigned a segment ID based on its position within the segment map. Accordingly, encoder 14 determines whether macroblock with identification number ID is to be mapped to segment 0 at step 506. If the macroblock with identification number ID is to be mapped to segment 0, encoder 14 encodes segment 0 (binary 00) for macroblock with identification number ID at step 508. If the macroblock with identification number ID is not to be mapped to segment 0, encoder 14 determines whether macroblock with identification number ID is to be mapped to segment 1 at step 510. If the macroblock with identification number ID is to be mapped to segment 1, encoder 14 encodes segment 1 (binary 01) for macroblock with identification number ID at step 512. If the macroblock with identification number ID is not to be mapped to segment 1, encoder 14 determines whether macroblock with identification number ID is to be mapped to segments at step 514. If the macroblock with identification number ID is to be mapped to segment 2, encoder 14 encodes segment 2 (binary 10) for macroblock with identification number ID at step 516. If the macroblock with identification number ID is not to be mapped to segment 2, encoder 14 encodes segment 3 (binary 11) for macroblock with identification number ID at step 518.

Once the segment identifier has been encoded for the macroblock at step 508, 512, 516 or 518, encoder 14 determines at step 520 whether ID is less than NUM_OF_MBS, which represents the total number of macroblocks in the current frame. If ID is not less than the total number of macroblocks, no more segment identifiers need to be encoded for each macroblock in the current frame. Otherwise, if ID is less than NUM_OF_MBS, encoder 14 increases ID by 1 at step 522 and repeats the process until all macroblock segment identifiers have been encoded for the current frame.

Exemplary pseudo code for implementing the steps of the method in FIG. 7 is illustrated as follows:

```
for each macroblock in the frame
{
    ...
    ...
    // If segmentation is enabled and a map update is indicate then
    // encode the segment id for this macroblock
    if ( SegmentationEnabled && UpdateMbSegmentationMap )
    {
        switch ( SegmentId )
        {
            case 0:
                EncodeBit (0, MbSegmentTreeProbs[0]);
                EncodeBit (0, MbSegmentTreeProbs[1]);
                break;
            case 1:
                EncodeBit (0, MbSegmentTreeProbs[0]);
                EncodeBit (1, MbSegmentTreeProbs[1]);
                break;
            case 2:
                EncodeBit (1, MbSegmentTreeProbs[0]);
                EncodeBit (0, MbSegmentTreeProbs[2]);
                break;
            case 3:
                EncodeBit (1, MbSegmentTreeProbs[0]);
                EncodeBit (1, MbSegmentTreeProbs[2]);
                break;
        }
    }
}
```

Referring to the pseudo code above, for each macroblock in a frame, if segmentation is enabled and the segmentation map is being updated, a segment identifier is encoded using, for example, an EncodeBit(value, probability) function. By making two calls to the EncodeBit function in the encoder, the segment identifier is encoded for each macroblock. In each call to the EncodeBit function, the encoder codes an input bit "value" which is either 0 or 1 by using one of the three "probability" values as context for the coding process. The three probability values are designated as an array of three values called MbSegmentTreeProbs. The context provides guidance to the encoder as to the probability distribution of each segment identifier depending on how likely it is to appear in the input sequence.

The aforementioned exemplary pseudo code is an implementation that supports four segment identifiers. As stated previously, other numbers of segments can be supported and the pseudo code may be modified accordingly to represent the correct number of segments. Furthermore, the exemplary pseudo code is not intended to be limited to any particular programming language and implementation thereof. It can be appreciated that a variety of programming languages and implementations thereof may be used to implement the teachings of embodiments of the invention as described herein.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for decoding compressed video information including a plurality of frames, each having a plurality of blocks, comprising:
    reading, from the video information, a segment map associating at least some of the plurality of blocks in a first frame of the plurality of frames with at least one segment identifier;
    reading, from the video information, a current block to be decoded by a decoder;
    reading, from the segment map, a segment identifier that is associated with the current block;
    reading, from the video information, at least one segment parameter associated with the segment identifier that is associated with the current block, each segment parameter being a setting of the decoder; and
    decoding the current block using the at least one segment parameter associated with the segment identifier that is associated with the current block.

2. The method of claim 1, wherein the at least one segment parameter includes at least one of a quantization parameter, a loop filter type, a loop filter strength value or a sub-pixel interpolation filter.

3. The method of claim 2, wherein a plurality of segment parameters are associated with the segment identifier and a first one of the plurality of segment parameters includes a value indicative of an alternate reference frame; and where the method further comprises:
updating the alternate reference frame using at least a second one of the plurality of segment parameters associated with the at least one segment identifier.

4. The method of claim 1, further comprising:
determining whether a frame subsequent to the first frame specifies an updated segment parameter for a specific one of the segments; and
associating the updated segment parameter to the specific one of the segments.

5. The method of claim 2, wherein the updated segment parameter is an incremental value to be added to the at least one segment parameter.

6. The method of claim 1, further comprising:
reading, from the video information, a record indicative of a segmentation condition of a frame subsequent to the first frame; and
setting the at least one segment parameter to a respective default parameter and suppressing the reading of the segment map, the reading of the segment identifier and the reading of the at least one segment parameter for all blocks of the frame subsequent to the first frame when the segmentation condition indicates to not apply segmentation.

7. The method of claim 1, wherein reading the segment map further comprises:
reading the at least one segment identifier in portions of the video information that are interleaved with data specific to the at least some of the plurality of blocks.

8. The method of claim 1, wherein reading the segment map further comprises:
reading the at least one segment identifier in a header file associated with the first frame.

9. The method of claim 1, further comprising:
determining whether a frame subsequent to the first frame is a key frame; and
setting the at least one segment parameter to a default value when the frame subsequent to the first frame is a key frame.

10. The method of claim 1, wherein the segment identifier that is associated with the current block is decoded using a binary arithmetic decoder.

11. A method for creating a stream of encoded video information including a plurality of frames, each having a plurality of blocks, comprising:
for at least a first frame, creating a segment map associating at least one block in the first frame with at least one segment identifier, and associating the at least one segment identifier with at least one segment parameter, each segment parameter being a setting of an encoder;
selecting a current block of the first frame for encoding by the encoder;
encoding a segment identifier associated with the current block based on the segment map; and
encoding the current block using the at least one segment parameter associated with the segment identifier that is associated with the current block.

12. The method of claim 11, further comprising:
for a second frame, detecting a segmentation modification condition;
when the segmentation modification condition is detected, updating the at least one segment parameter and storing the updated segment parameter with video information associated with the second frame.

13. The method of claim 12, wherein the updated segment parameter is an incremental value.

14. The method of claim 11, further comprising:
for a second frame, detecting a segmentation condition; and
when the segmentation condition is detected, storing a segmentation flag with encoded video information associated with the second frame.

15. The method of claim 11, wherein the at least one segment parameter includes at least one of a quantization parameter, a loop filter type, a loop filter strength or a sub-pixel interpolation filter.

16. The method of claim 15, wherein the at least one segment parameter includes a value indicative of an alternate reference frame; and where the method further comprises:
updating the alternate reference frame using the at least one segment parameter.

17. The method of claim 11, further comprising:
storing the at least one segment identifier in portions of the video information that are interleaved with data specific to the at least one block.

18. The method of claim 11, further comprising:
storing the at least one segment identifier in a header portion of the first frame.

19. The method of claim 11, wherein the segment identifier that is associated with the current block is encoded using a binary arithmetic encoder.

20. A method for decoding a stream of encoded video information including a plurality of frames, each having a plurality of blocks, comprising:
for at least a first frame, reading from the video information a segment map associating at least some of the plurality of blocks in the first frame with at least one segment identifier;
reading, from the video information, a current block of the first frame to be decoded by a decoder;
reading, from the segment map, a segment identifier associated with the current block;
reading, from the video information, at least one segment parameter associated with the segment identifier that is associated with the current block, each segment parameter being a setting of the decoder;
decoding the current block using the at least one segment parameter associated with the segment identifier that is associated with the current block; and
for a second frame, decoding a block in the second frame corresponding to the current block in the first frame using the segment identifier that is associated with the current block.

21. The method of claim 20, wherein the at least one segment parameter includes at least one of a quantization parameter, a loop filter type, a loop filter strength value or a subpixel interpolation filter.

22. The method of claim 20, wherein the segment identifier that is associated with the current block is decoded using a binary arithmetic decoder.

23. The method of claim 20 wherein the second frame includes frame level header information including a bit indicating whether segmentation is enabled or disabled for the second frame, a bit indicating whether or not to update the segment map, a bit indicating whether to update the at least one segmentation parameter for the second frame, a value for each of the at least one segmentation parameter, and a bit indicating whether the value is a delta value or an absolute value.

* * * * *